United States Patent
Yasui et al.

(10) Patent No.: US 11,899,430 B2
(45) Date of Patent: Feb. 13, 2024

(54) CONTROL DEVICE

(71) Applicant: OMRON Corporation, Kyoto (JP)

(72) Inventors: Yuto Yasui, Kyoto (JP); Tomonori Shimamura, Kyoto (JP); Masahiko Nakano, Kyoto (JP); Takafumi Okura, Kyoto (JP); Junji Shimamura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 366 days.

(21) Appl. No.: 17/598,499

(22) PCT Filed: Mar. 5, 2020

(86) PCT No.: PCT/JP2020/009427
§ 371 (c)(1),
(2) Date: Sep. 27, 2021

(87) PCT Pub. No.: WO2020/203016
PCT Pub. Date: Oct. 8, 2020

(65) Prior Publication Data
US 2022/0171367 A1    Jun. 2, 2022

(30) Foreign Application Priority Data
Mar. 29, 2019 (JP) ................. 2019-067191

(51) Int. Cl.
*G05B 19/41* (2006.01)
*G05B 19/4155* (2006.01)

(52) U.S. Cl.
CPC .......... *G05B 19/4155* (2013.01); *G05B 2219/41289* (2013.01)

(58) Field of Classification Search
USPC .......................................................... 700/28
See application file for complete search history.

(56) References Cited

U.S. PATENT DOCUMENTS 4,000,449 A    12/1976   Gripp
4,084,083 A *   4/1978   McNally ............. G05B 19/373
                                                        901/3
(Continued)

FOREIGN PATENT DOCUMENTS

CN    1521583 A    8/2004
CN    1848011 A    10/2006
(Continued)

OTHER PUBLICATIONS

International Search Report issued in Intl. Appln. No. PCT/JP2020/009427 dated Jun. 2, 2020. English translation provided.
(Continued)

*Primary Examiner* — Hien D Khuu
(74) *Attorney, Agent, or Firm* — ROSSI, KIMMS & McDOWELL LLP (57) ABSTRACT

A controller for performing synchronization control over the master axis and the slave axis to follow an electronic cam profile includes a reference position calculator that, in response to power being restored after a power disconnect, obtains a position of the master axis and calculates reference positions of the master axis and the slave axis based on the obtained position of the master axis, a position of the master axis at cam synchronization, and the electronic cam profile, and a return control unit that performs return control to determine a position of the slave axis corresponding to a current position of the master axis based on the current position of the master axis, the electronic cam profile, and the reference positions of the master axis and the slave axis calculated by the reference position calculator, and that moves the slave axis to the determined position.

4 Claims, 6 Drawing Sheets

(56) References Cited

U.S. PATENT DOCUMENTS

| | | |
|---|---|---|
| 6,366,045 B1 | 4/2002 | Fahrbach et al. |
| 2003/0090230 A1* | 5/2003 | Fujibayashi ............ G05B 19/19 318/625 |
| 2004/0056626 A1 | 3/2004 | Fujinawa |
| 2004/0128022 A1* | 7/2004 | Fujibayashi ....... G05B 19/4103 700/213 |
| 2004/0158335 A1 | 8/2004 | Fujibayashi et al. |
| 2004/0164698 A1 | 8/2004 | Cazzavillan et al. |
| 2006/0235565 A1 | 10/2006 | Endo et al. |
| 2008/0082203 A1 | 4/2008 | Watanabe et al. |
| 2013/0002185 A1 | 1/2013 | Hosomi et al. |
| 2016/0187868 A1 | 6/2016 | Kanemaru et al. |
| 2017/0146961 A1 | 5/2017 | Sekine et al. |
| 2017/0153626 A1 | 6/2017 | Oonishi |
| 2017/0315534 A1 | 11/2017 | Horiguchi |

FOREIGN PATENT DOCUMENTS

| | | | |
|---|---|---|---|
| CN | 101154099 A | | 4/2008 |
| CN | 102854901 A | | 1/2013 |
| CN | 105739431 A | | 7/2016 |
| EP | 1447728 A3 | | 1/2006 |
| EP | 1308809 A3 | | 3/2006 |
| IT | VI20010149 A1 | | 1/2003 |
| JP | 08-022313 | * | 1/1996 |
| JP | 2011014099 A | * | 1/2011 |
| JP | 2011180983 A | | 9/2011 |
| JP | 5506456 B2 | | 5/2014 |
| JP | 2015197249 A | | 11/2015 |
| JP | 2017102509 A | | 6/2017 |
| JP | 2017196711 A | | 11/2017 |
| KR | 10-1269987 B1 | * | 5/2013 |
| WO | 02091090 A1 | | 11/2002 |

OTHER PUBLICATIONS

Written Opinion issued in Intl. Appln. No. PCT/JP2020/009427 dated Jun. 2, 2020. English translation provided.

Extended European search report issued in European Appln. No. 20782171.1 dated Nov. 7, 2022.

BAI "Design of electronic cam control system based on servo-motor" Journal of Mechanical & Electrical Engineering. Jun. 2012: pp. 689-692. vol. 29 No. 6. English abstract provided. Cited in NPL 3.

Nie et al. "Design of Electronic Cam Control System for Cigarette Packaging Machine" Mechanical Engineer, China Tobacco Machinery Technology Center Co., Ltd. 2016: pp. 208-211. English abstract provided. Cited in NPL 3.

Office Action issued in Chinese Appln. No. 202080025662.8 dated Sep. 15, 2023. English translation provided.

* cited by examiner

CONTROL DEVICE

FIELD

The present invention relates to a controller for performing electronic cam control.

BACKGROUND

Motion control for controlling the motions of motors used in machines and equipment may be performed using electronic cams. An electronic cam achieves the operation of a mechanical cam through electronic control and performs synchronization control for synchronizing a master axis and a slave axis to follow an electronic cam profile defined using software.

At an emergency stop of such an electronic cam system that performs synchronization control (hereafter, electronic cam control), a slave axis may stop at a position deviating from its intended position (hereafter, a position corresponding to the master axis) defined by a stop position of the master axis and the electronic cam profile. When resuming the electronic cam control with the slave axis deviating from the position corresponding to the master axis, the electronic cam system cannot operate each axis as intended. Techniques have been developed for calculating the position corresponding to the master axis using the position of the master axis after an emergency stop and for moving the slave axis to the calculated position corresponding to the master axis without moving the master axis (e.g., Patent Literature 1).

CITATION LIST

Patent Literature

Patent Literature 1: Japanese Patent No. 5506456

SUMMARY

Technical Problem

The slave axis can stop at the position deviating from the position corresponding to the master axis when the power to the controller is disconnected in, for example, a power outage or device maintenance. A known controller involves a manual operation of a worker to move the slave axis to the position corresponding to the master axis after the power disconnect.

One or more aspects of the present invention are directed to a controller that causes a slave axis to automatically return to a position corresponding to a master axis after a power disconnect.

Solution to Problem

In response to the above issue, a controller according to one aspect of the present invention is a controller for performing synchronization control over a master axis and a slave axis to follow an electronic cam profile. The controller includes a reference position calculator and a return control unit. The reference position calculator, in response to power being restored after a power disconnect, obtains a position of the master axis and calculates a reference position of the master axis and a reference position of the slave axis based on the obtained position of the master axis, a position of the master axis at cam synchronization, and the electronic cam profile. The return control unit performs return control to determine a position of the slave axis corresponding to a current position of the master axis based on the current position of the master axis, the electronic cam profile, and the reference position of the master axis and the reference position of the slave axis calculated by the reference position calculator, and moves the slave axis to the determined position.

More specifically, a power disconnect in, for example, a power outage or device maintenance can cause the axes to be at reference positions different from the reference positions before the power disconnect. A known controller thus involves a manual operation of moving the slave axis to return to the position corresponding to the master axis after the power disconnect. The controller according to one or more aspects of the present invention recalculates the reference positions of the axes once power is restored. Thus, the controller causes the slave axis to automatically return to the position corresponding to the master axis after the power disconnect in, for example, a power outage or device maintenance.

The controller may further include an information provider that causes a state screen to appear on a display before the control is performed by the return control unit. The state screen may include a graph showing a relationship between the positions of the master axis and the slave axis and the electronic cam profile. The information provider may change the position of the slave axis shown in the graph in the return control in response to the return control being performed by the return control unit. The controller including the information provider allows a user to easily determine the situation. This controller increases user convenience.

The controller including the information provider may include the return control unit that starts the return control in response to a predetermined button on the state screen being operated.

Advantageous Effects

The controller according to the aspects of the present invention causes the slave axis to automatically return to the position corresponding to the master axis after a power disconnect in, for example, a power outage.

DETAILED DESCRIPTION

Figure 1:
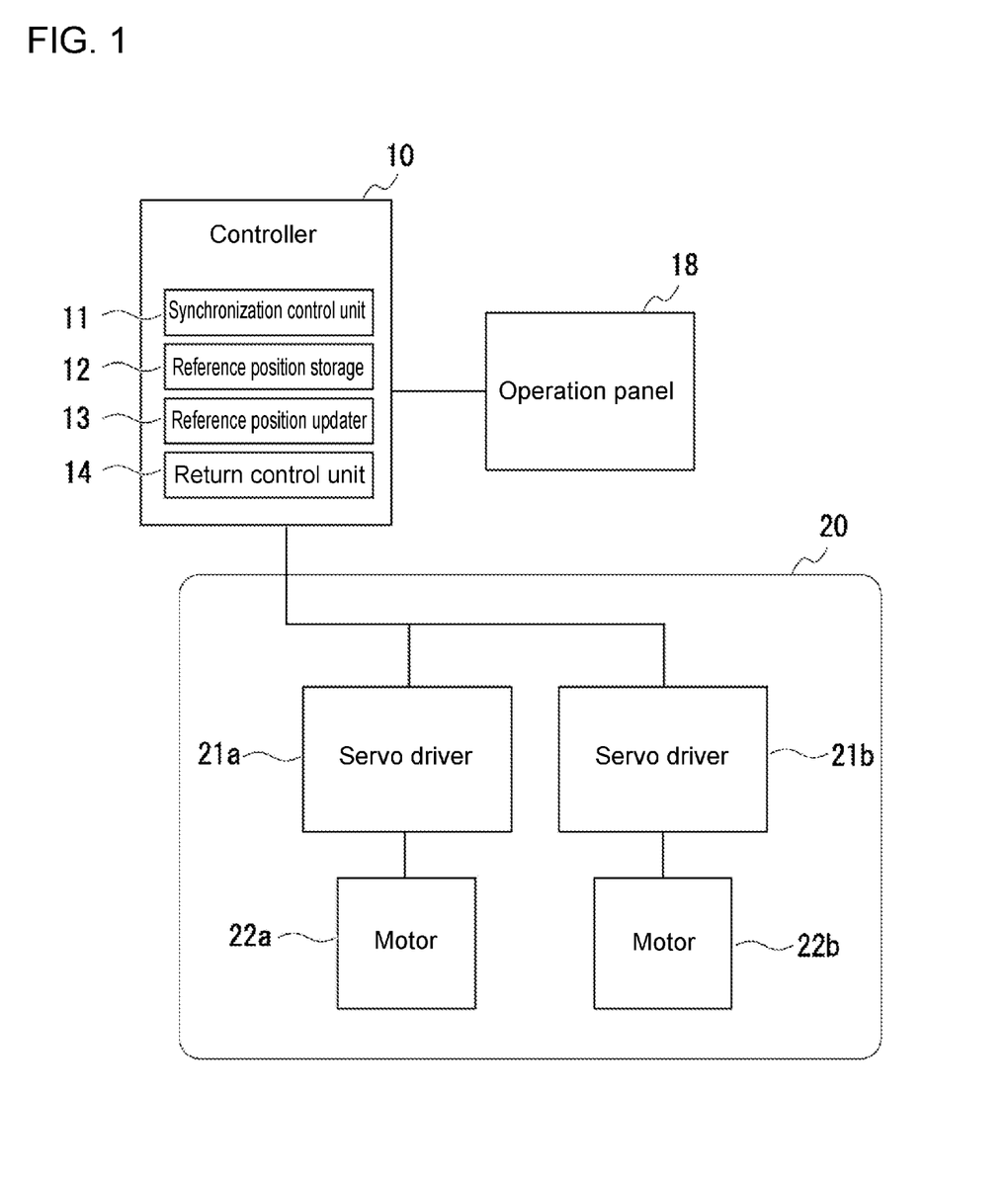
FIG. 1 is a diagram describing the configuration and implementation of a controller according to one embodiment of the present invention.

FIG. 1 is a diagram describing the configuration and implementation of a controller 10 according to one embodiment of the present invention.

The controller 10 according to the present embodiment is a programmable logic controller (PLC) developed for controlling a servo system 20. The servo system 20 includes a master axis and multiple slave axes at positions controlled with reference to the position of the master axis.

The controller 10 may control any number of slave axis. The configuration and the functions of the controller 10 controlling the servo system 20 will be described below by way of example. The servo system 20 includes a motor 22a drivable by a servo driver 21a and a motor 22b drivable by a servo driver 21b as shown in FIG. 1. The axis of the motor 22a is the master axis, and the axis of the motor 22b is the slave axis. Providing commands to control the position of the master axis (the axis of the motor 22a) and the position of the slave axis (the axis of the motor 22b) to the servo driver 21a or 21b may be hereafter simply referred to as controlling the positions of the master axis and the slave axis.

The controller 10 according to the present embodiment is a PLC connectable to an operation panel 18 and the servo system 20. The controller 10 is programmed to be operable as a synchronization control unit 11, a reference position storage 12, a reference position updater 13, a return control unit 14, and a user interface (UI) control unit 15. The operation panel 18 is a computer including a touchscreen, and functions as an input-output unit for the controller 10.

The reference position storage 12 is a nonvolatile storage for storing the reference positions of the master axis and the slave axis. The reference position storage 12 also stores the positions of the master axis and the slave axis at the time when the master axis and the slave axis are synchronized with each other through cam control. These axis positions are hereafter referred to as the position of the master axis at cam synchronization and the position of the slave axis at cam synchronization. The controller 10 typically uses part of a rewritable nonvolatile memory such as a flash read-only memory (ROM), or storage such as a hard disk drive (HDD) that are included in the controller 10 as the reference position storage 12.

Figure 2A:
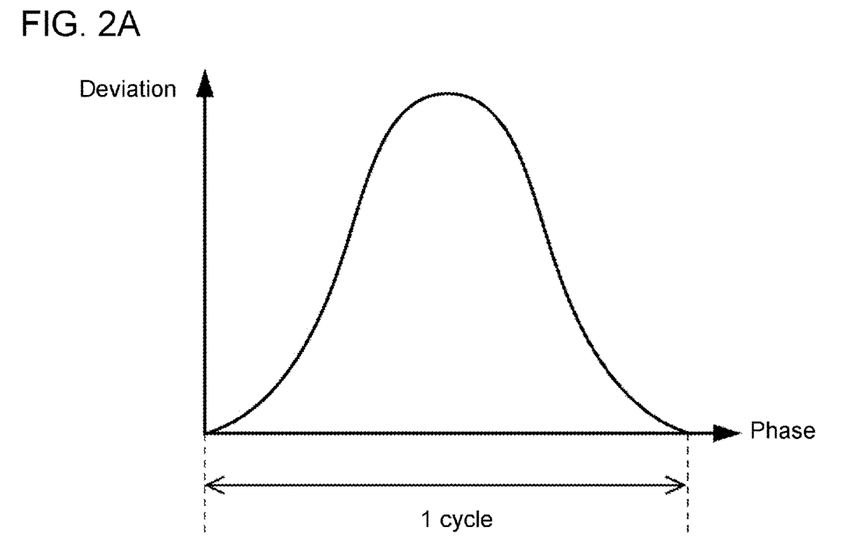
FIG. 2A is a graph showing an electronic cam profile.
Figure 2B:
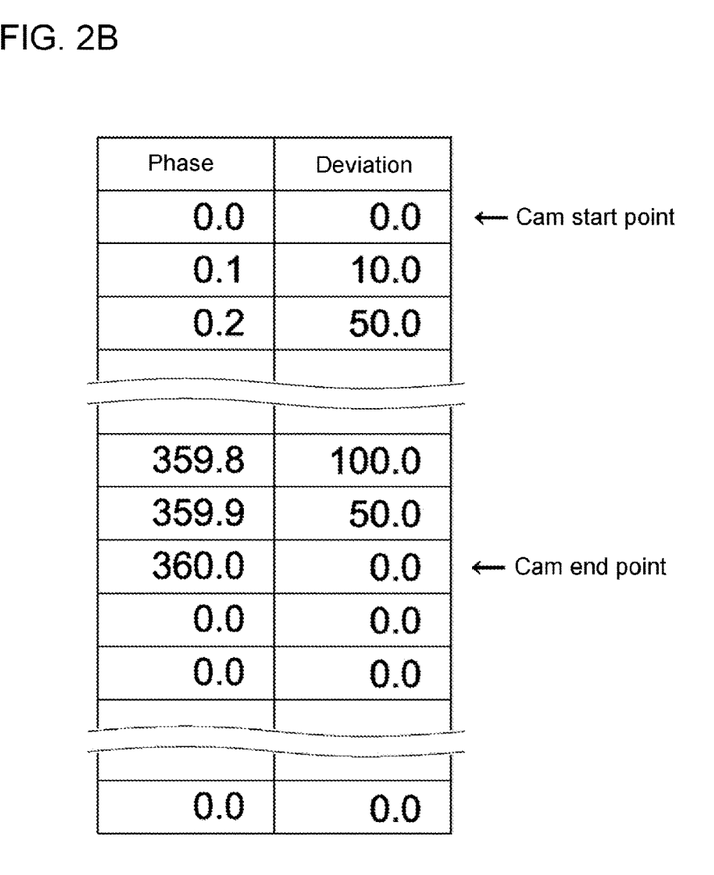
FIG. 2B is a table showing the electronic cam profile.

The synchronization control unit 11 controls the position of the master axis (the rotation angle of the axis of the motor 22a). The synchronization control unit 11 also controls the position of the slave axis (the rotation angle of the axis of the motor 22b) to correspond to the position of the master axis to follow a preset electronic cam profile. The electronic cam profile used by the synchronization control unit 11 to control the slave axis includes information about the relationship between the phase of the master axis and the deviation of the slave axis shown in FIG. 2A. The phase of the master axis refers to a change in the position of the master axis either from its position at cam synchronization or from the reference position of the master axis. The deviation of the slave axis refers to a change in the position of the slave axis either from the position of the master axis at cam synchronization or from the reference position of the slave axis. For example, the information in the table shown in FIG. 2B can be used as the electronic cam profile. The data values (for phase and deviation) between the cam start point and the cam end point in FIG. 2B correspond to one cycle in FIG. 2A. The phase at the cam end point defined by the electronic cam profile is hereafter referred to as an end point phase, and the deviation at the same end point as an end point deviation. In the example in FIG. 2B, the end point phase is the phase of data at the cam end point, and the end point deviation is the deviation of data at the cam end point.

The reference position updater 13 performs a reference position update process every time the master axis reaches the cam end point during the cam control of the master axis and the slave axis performed by the synchronization control unit 11. The reference position updater 13 also performs the reference position update process when the controller 10 resumes after a power disconnect in, for example, a power outage or device maintenance.

The reference position updater 13 performs the reference position update process by obtaining the position of the master axis from the servo system 20, calculating the reference positions of the master axis and the slave axis based on the obtained master axis position, and updating the reference positions of the master axis and the slave axis stored in the reference position storage 12 using the calculation results. The reference position updater 13 calculates the reference positions of the master axis and the slave axis using Formulas (1) and (2) below.

$$\text{Reference position of master axis} = \text{Floor}((\text{current position of master axis} - \text{position of master axis at cam synchronization})/\text{end point phase}) \times \text{end point phase} + \text{position of master axis at cam synchronization} \quad (1)$$

$$\text{Reference position of slave axis} = \text{Floor}((\text{current position of master axis} - \text{position of master axis at cam synchronization})/\text{end point phase}) \times \text{end point deviation} + \text{deviation of slave axis at cam synchronization} \quad (2)$$

The current position of the master axis in Formulas (1) and (2) is the position of the master axis obtained from the servo system 20. The floor refers to a floor function.

Figure 3:
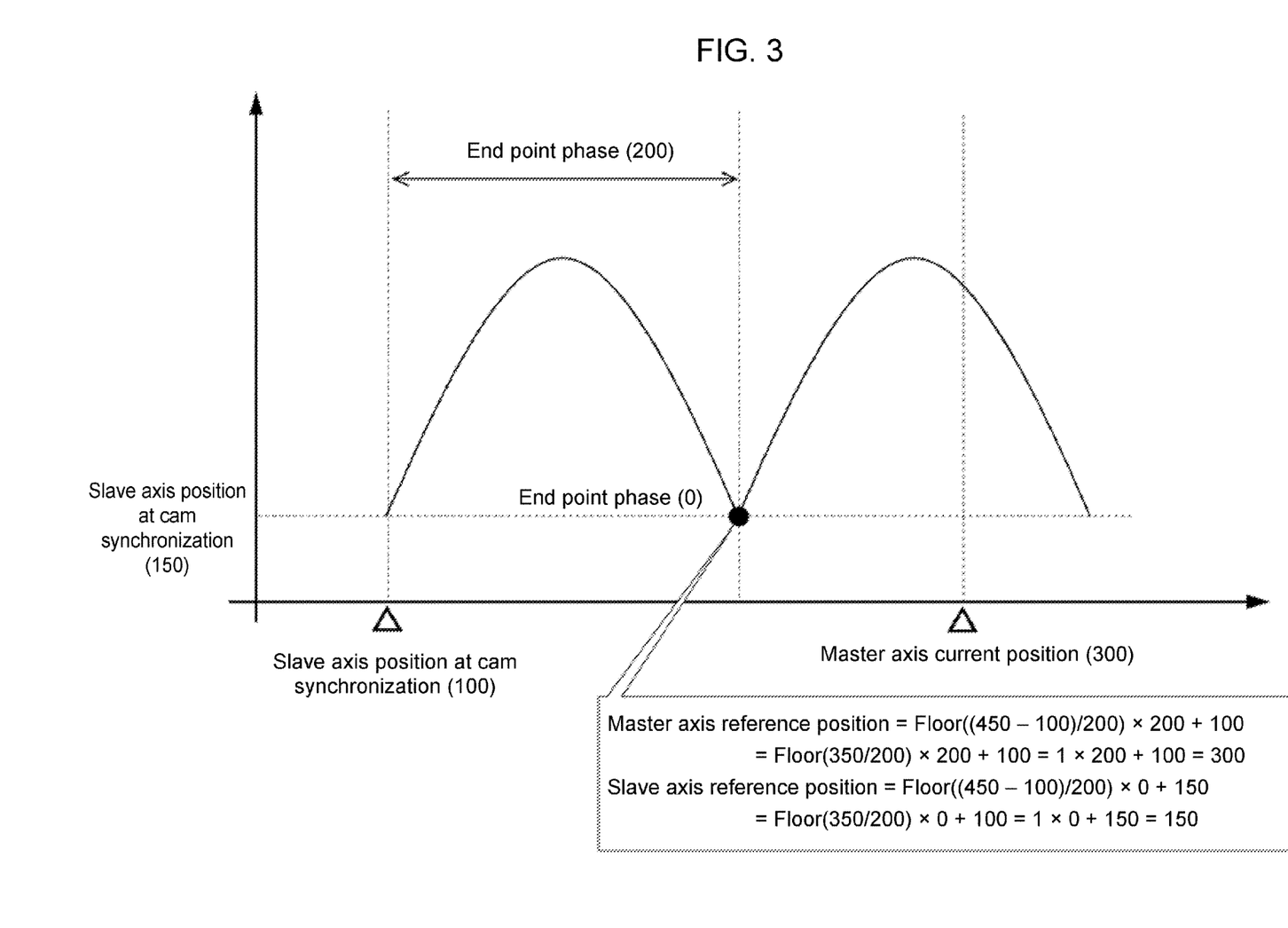
FIG. 3 is a graph used in a reference position update process for calculating the reference positions of a master axis and a slave axis.

More specifically, as shown in FIG. 3, when the position of the master axis at cam synchronization is 100, the position of the slave axis at cam synchronization is 150, the end point phase is 200, the end point deviation is 0, and the obtained current position of the master axis is 450, the reference position of the master axis is calculated to be 300 and the reference position of the slave axis to be 150 by the calculations shown in the figure in the reference position update process.

Figure 4:
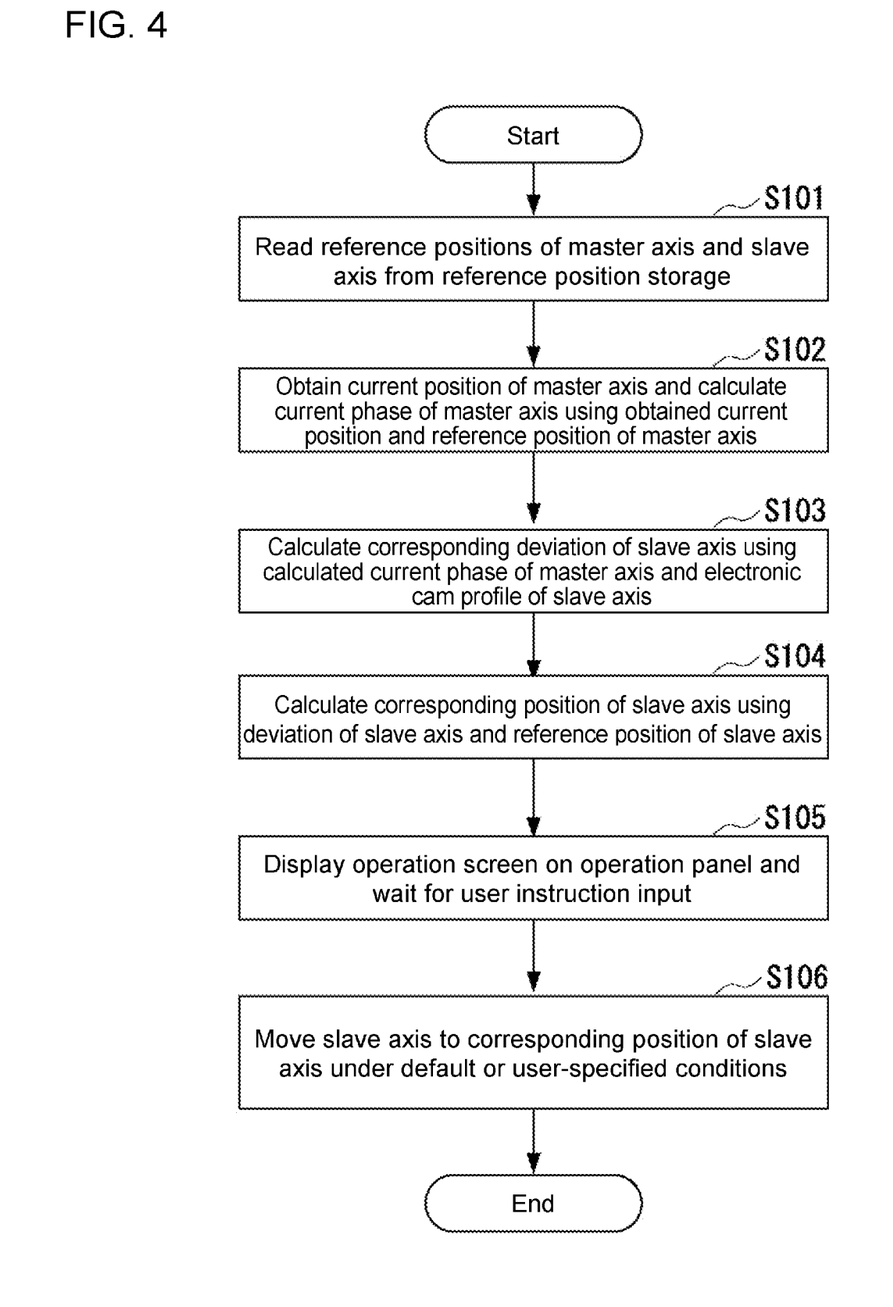
FIG. 4 is a flowchart of a return control process performed by a return control unit included in the controller.

The return control unit 14 (FIG. 1) performs a return control process shown in FIG. 4. The return control unit 14 performs the process after the controller 10 resumes and the reference position updater 13 completes the reference position update process after the power disconnect in, for example, a power outage or device maintenance.

Upon completion of the reference position update process by the reference position updater 13 after the power disconnect, the return control unit 14 starts the return control process by first reading the reference positions of the master axis and the slave axis from the reference position storage 12 (step S101). Subsequently, the return control unit 14 obtains the current position of the master axis from the servo system 20, and calculates the current phase of the master axis by subtracting the reference position of the master axis from the obtained current position of the master axis (step S102).

Figure 5:
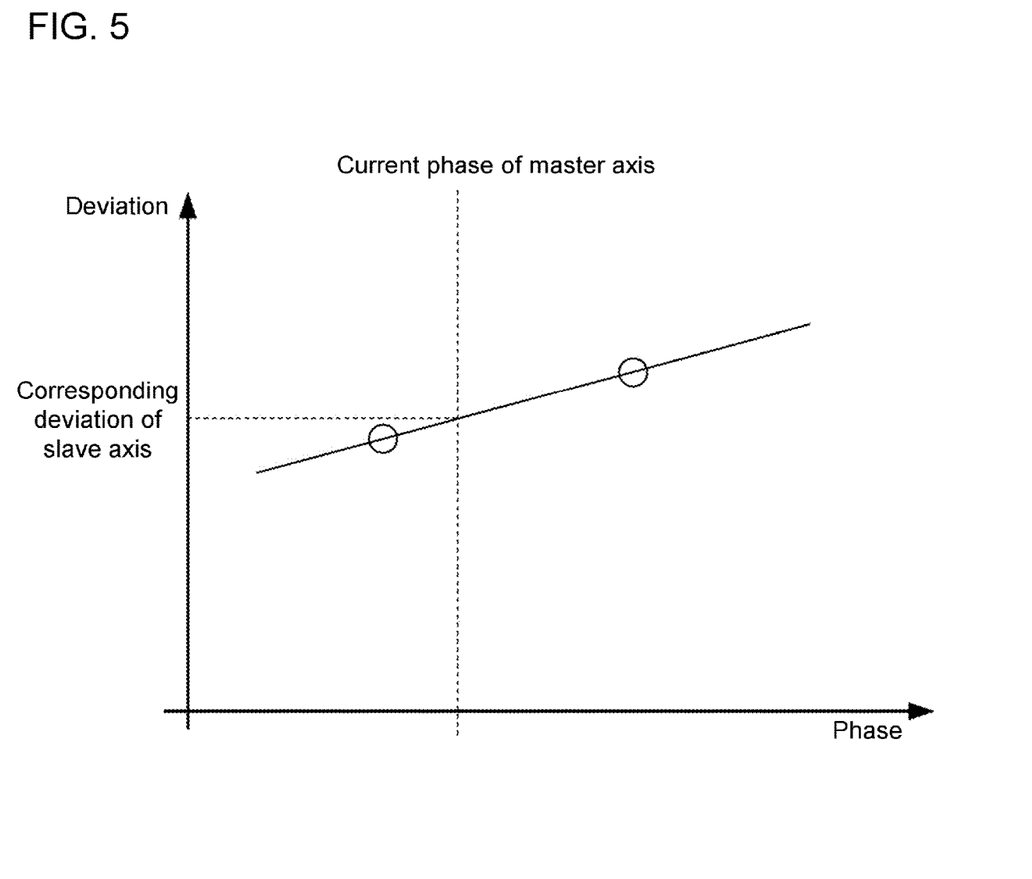
FIG. 5 is a graph describing an example procedure for calculating the corresponding deviation of the slave axis.

The return control unit 14 then calculates, using the calculated current phase of the master axis and the electronic cam profile of the slave axis, the corresponding deviation of the slave axis, which is the deviation of the slave axis corresponding to the current position of the master axis (step S103). When the electronic cam profile is the information in the table in FIG. 2B, the return control unit 14 calculates the corresponding deviation of the slave axis, which is the deviation corresponding to the current phase of the master axis, using linear interpolation between the two deviation points at the two phases nearest the current phase of the master axis in the electronic cam profile in step S102, as in the example schematically shown in FIG. 5.

After step S103, the return control unit 14 causes an operation screen to appear on the display of the operation panel 18 (step S103).

Figure 6:
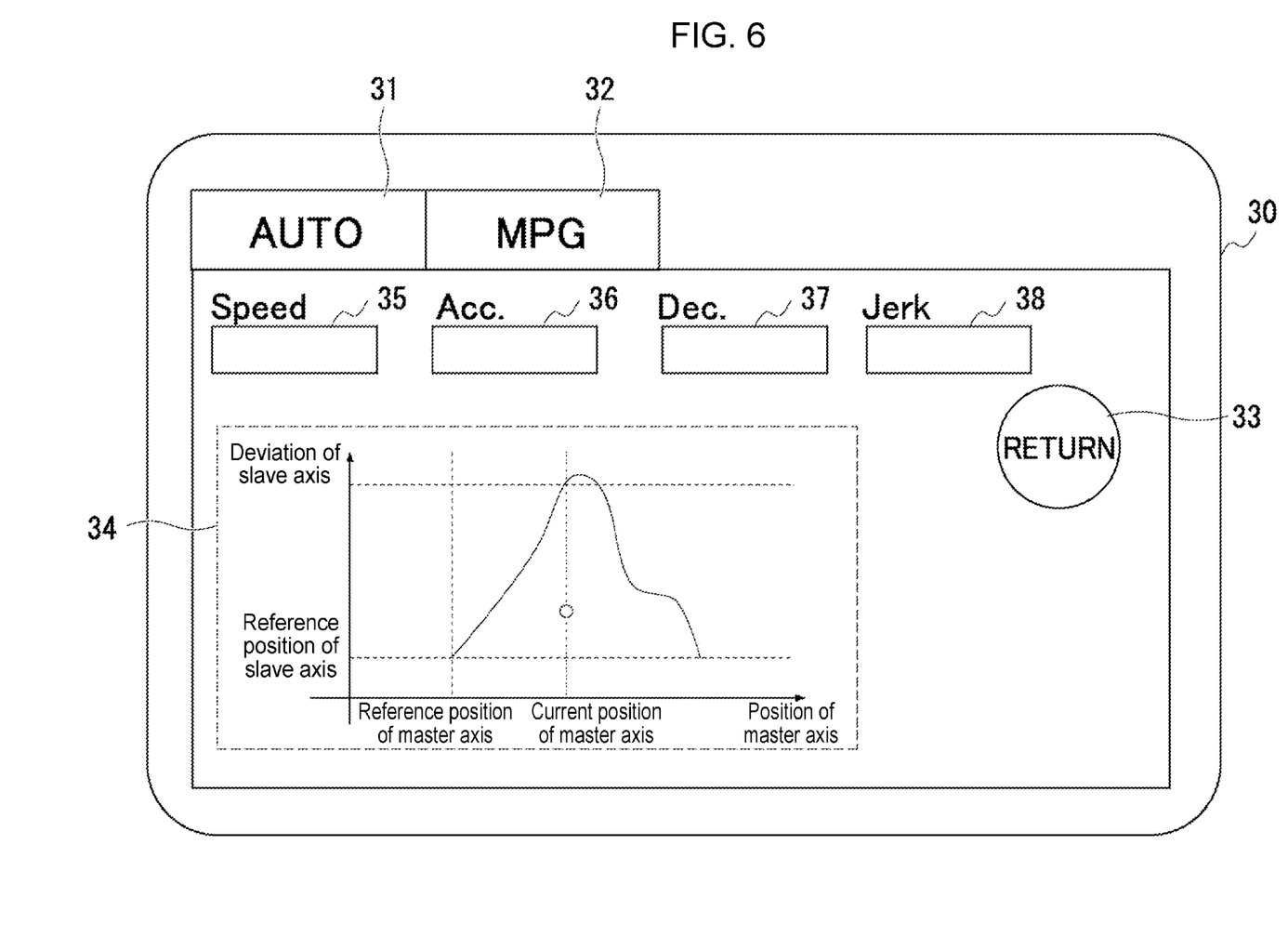
FIG. 6 is a diagram of an operation screen to appear on a display panel as controlled by the controller.

FIG. 6 is a diagram of an operation screen 30 appearing on the display of the operation panel 18 in step S103. As illustrated, the operation screen 30 includes an AUTO button 31, an MPG button 32, a RETURN button 33, a graph area 34, and parameter input fields 35 to 38.

The graph area 34 includes a graph showing the relationship between the positions of the master axis and the slave axis (white circle) and the electronic cam profile (curve). The AUTO button 31 is to be pressed by a user for operation without specifying parameters, such as speed, used in controlling the position of the slave axis. The RETURN button 33 is to be pressed by the user for operation specifying parameters, such as speed, used in controlling the position of the slave axis. This button is to be pressed in response to intended values being entered in the parameter input fields 35 to 38. The MPG button 32 is to be pressed by the user for manually controlling the position of the slave axis.

The return control unit 14 that has caused the operation screen 30 to appear on the display of the operation panel 18 waits for an instruction input by the user (step S103).

In response to the AUTO button 31 or the RETURN button 33 being pressed by the user, the return control unit 14 moves the slave axis to the corresponding position of the slave axis under the default conditions or the conditions specified by the user (step S104), and ends the return control process. In step S104, the return control unit 14 also changes the position of the white circle indicating the positions of the master axis and the slave axis in the graph on the operation screen 30 as the control proceeds.

In response to the MPG button 32 being pressed by the user, the return control unit 14 displays a control screen for manually controlling the position of the slave axis on the operation screen 30 in step S104. The return control unit 14 then controls the slave axis in accordance with the operation received on the control screen, and ends the return control process.

More specifically, in response to a power disconnect in, for example, a power outage or device maintenance, the axes can be at reference positions different from the reference positions before the power disconnect. A known controller thus involves a manual operation of moving the slave axis to return to the position corresponding to the master axis after the power disconnect. As described above, the controller 10 according to one or more embodiments recalculates the reference positions of the axes once power is restored after the power disconnect. Thus, the controller 10 causes the slave axis to automatically return to the position corresponding to the master axis without any inconvenience after the power disconnect.

Modifications

The controller 10 described above may be modified variously. For example, the reference position updater 13 may perform the reference position update process at least once every cycle of control defined by the electronic cam profile. Thus, the reference position updater 13 may perform the reference position update process at a time different from the time described above (when the master axis reaches the cam end point). The reference position updater 13 may use any formulas other than Formula (1) or (2) described above to calculate the reference positions of these axes in the reference position update process.

The graph on the operation screen 30 (FIG. 5) may show the position of the master axis and the position of the slave axis separately from each other. The MPG button 32, the RETURN button 33, and the parameter input fields 35 to 38 may be eliminated from the operation screen 30. Further, the controller 10 may be modified to move the slave axis to the position corresponding to the master axis without waiting for an instruction input by the user.

APPENDIX

A controller (10) for performing synchronization control over a master axis and a slave axis to follow an electronic cam profile, the controller (10) comprising:

a reference position calculator (13) configured to, in response to power being restored after a power disconnect, obtain a position of the master axis and calculate a reference position of the master axis and a reference position of the slave axis based on the obtained position of the master axis, a position of the master axis at cam synchronization, and the electronic cam profile; and a return control unit (14) configured to perform return control to determine a position of the slave axis corresponding to a current position of the master axis based on the current position of the master axis, the electronic cam profile, and the reference position of the master axis and the reference position of the slave axis calculated by the reference position calculator, and to move the slave axis to the determined position.

REFERENCE SIGNS LIST

10 controller
11 synchronization control unit
12 reference position storage
13 reference position updater
14 return control unit
18 operation panel
20 servo system
21a, 21b servo driver
22a, 22b motor
30 operation screen
31 AUTO button
32 MPG button
33 RETURN button
34 to 38 parameter input field

The invention claimed is:

1. A control device for performing synchronization control over a master axis and a slave axis to follow an electronic cam profile, the control device comprising:

a reference position calculator configured to, in response to power being restored after a power disconnect, obtain a position of the master axis and calculate a reference position of the master axis and a reference position of the slave axis based on the obtained position of the master axis, a position of the master axis at cam synchronization, and the electronic cam profile; and a return control unit configured to perform return control to determine a position of the slave axis corresponding to a current position of the master axis based on the current position of the master axis, the electronic cam profile, and the reference position of the master axis and the reference position of the slave axis calculated by the reference position calculator, and to move the slave axis to the determined position.

2. The control device according to claim 1, further comprising:

an information provider configured to cause a state screen to appear on a display before the return control is performed by the return control unit, the state screen including a graph showing a relationship between the positions of the master axis and the slave axis and the electronic cam profile.

3. The control device according to claim 2, wherein the information provider changes the position of the slave axis shown in the graph in the return control in response to the return control being performed by the return control unit.

4. The control device according to claim 2, wherein the return control unit starts the return control in response to a predetermined button on the state screen being operated.

* * * * *